United States Patent
Wang

(10) Patent No.: US 9,188,309 B2
(45) Date of Patent: Nov. 17, 2015

(54) DIRECT TYPE BACKLIGHT MODULE STRUCTURE

(71) Applicant: Shenzhen China Star Optoelectronics Technology Co., Ltd., Shenzhen (CN)

(72) Inventor: Yewen Wang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 13/805,935

(22) PCT Filed: Oct. 15, 2012

(86) PCT No.: PCT/CN2012/082941
§ 371 (c)(1),
(2) Date: Dec. 20, 2012

(87) PCT Pub. No.: WO2014/056235
PCT Pub. Date: Apr. 17, 2014

(65) Prior Publication Data
US 2015/0219307 A1 Aug. 6, 2015

(30) Foreign Application Priority Data
Oct. 10, 2012 (CN) .......................... 2012 1 0382103

(51) Int. Cl.
G09F 13/04 (2006.01)
F21V 7/00 (2006.01)
G02F 1/1335 (2006.01)
F21V 9/00 (2015.01)
F21Y 105/00 (2006.01)

(52) U.S. Cl.
CPC ................. *F21V 7/0083* (2013.01); *F21V 9/00* (2013.01); *G02F 1/133603* (2013.01); *G02F 1/133605* (2013.01); *F21Y 2105/001* (2013.01)

(58) Field of Classification Search
CPC ............................. G02F 1/133603; F21V 9/00
USPC ........................................ 362/97.1–97.4, 613
See application file for complete search history.

(56) References Cited

U.S. PATENT DOCUMENTS 7,815,330 B2 * 10/2010 Kim et al. .................... 362/97.3
7,959,322 B2 * 6/2011 Smith ........................... 362/235

* cited by examiner

*Primary Examiner* — Anabel Ton
(74) *Attorney, Agent, or Firm* — Ladas & Parry LLP

(57) ABSTRACT

The present invention relates to a direct type backlight module structure, which comprises a light casing having a first height, and the light casing comprises a base plate; a reflection device disposed on the base plate, and the reflection device comprises a plurality of curved structural units, and each of the curved structural units is bent to form a second height and an intermediate base, and each of the curved structural units is configured at a predetermined spacing therebetween to be disposed on the base plate; and a plurality of light sources disposed on the reflection device, and each of the light sources is configured at the predetermined spacing therebetween; in which each of the light sources is disposed on the intermediate base of each of the curved structural units of the reflection device.

10 Claims, 4 Drawing Sheets

1-1'

DIRECT TYPE BACKLIGHT MODULE STRUCTURE

FIELD OF THE INVENTION

The present invention relates to a backlight module structure, and more particularly to a direct type backlight module structure.

BACKGROUND OF THE INVENTION

A backlight module is used to provide the backlight source of liquid crystal displays (LCDs), which is an indispensable and important display component of LCDs. In the prior art, the backlight source of LEDs of a direct type light emitted diode is replaced from conventional cold cathode fluorescent lamps (CCFLs) to white LEDs, and with respect to the conventional CCFLs, the white LEDs is greener and more efficiency. However, corresponding light source is converted to point light source of white LEDs from linear light source of conventional CCFLs, so that the difficulty of achieving uniformly mixing light becomes greater. Furthermore, white LEDs of the direct type light emitted diode generally apply high-power LEDs to reduce the requirement of cost. Therefore, the amount of LEDs applied becomes less, so as to cause the spacing of the arrangement therebetween LEDs larger, further causing the difficulty of the point light source of uniform mixing light getting larger. Moreover, in the direct type backlight, the high-power white LEDs needs larger thickness of the light casing for avoiding generating the mura of LEDs to completely mix light, so that the thickness of the backlight module is too large to contrary the slim trend of LEDs in the prior art. Here, the backlight phenomenon of irregular luminance generally is termed as "mura".

As a result, it is necessary to provide a new type backlight module structure to solve the problems that its can not uniformly mix light and the thickness of the light casing is too large, as the foregoing backlight module.

SUMMARY OF THE INVENTION

For this reason, the object of the present invention is to provide a direct type backlight module structure to solve the problems that its can not uniformly mix light and the thickness of the light casing is too large. Moreover, the present invention reduces the applied amount of LEDs to decrease the production cost.

To achieve the above object of the present invention, the present invention provides a direct type backlight module structure which comprises: a light casing having a first height, and the light casing comprises a base plate; a reflection device disposed on the base plate, and the reflection device comprises a plurality of curved structural units, wherein each of the curved structural units is bent to form a second height and an intermediate base, and each of the curved structural units is configured at a predetermined spacing therebetween to be disposed on the base plate; and a plurality of light sources disposed on the reflection device, wherein each of the light sources is configured at the predetermined spacing therebetween, and the predetermined spacing is greater than the first height of the light casing; wherein each of the light sources is disposed on the intermediate base of each of the curved structural units of the reflection device, an emitted light of each of the light sources to pass through a surface of each of the curved structural units to form uniformly distributed reflection light.

In one embodiment of the present invention, the curved structural units are arranged in an array-type on the base plate of the light casing.

In one embodiment of the present invention, the first height of the light casing is between 0.3 and 1 times of the predetermined spacing of the curved structural units.

In one embodiment of the present invention, further comprising a plurality of strip plate members and each of the strip plate members a predetermined amount of cured structural plate members which are connected to the base plate of the light casing.

In one embodiment of the present invention, the first height of the light casing is either greater than or equal to the second height of each of the curved structural units.

In one embodiment of the present invention, the material of the reflection device comprises either polyethylene terephthalate (PET) or polycarbonate (PC).

In one embodiment of the present invention, the light sources comprise a plurality of light emitting diodes (LEDs).

In one embodiment of the present invention further comprising a diffusion plate disposed above the reflection device for receiving the reflected light.

In one embodiment of the present invention further comprising a diffusion film disposed on the diffusion plate for receiving the distributed reflection light.

In one embodiment of the present invention, further comprising either a brightness enhancement film (BEF) or dual brightness enhancement film (DBEF) for receiving the reflected light.

In one embodiment of the present invention, each of the curved structural units comprises a mean curvature, by adjusting the second height and the mean curvature of each of the curved structural units to allow an emitted light of each of the light sources to pass through the surface of each of the curved structural units for forming uniformly the distributed reflection light.

The direct backlight module structure of the present invention is provided to solve the problems that its can not uniformly mix light and the thickness of the light casing is too great, so as to decrease the applied amount of LEDs to reduce the production cost. Moreover, based on adjusting the height and curvature of each of the curved structural units, the reflection device is optimized to uniform the emitted light, so that the utilization of the LEDs light sources is further increased. Therefore, it further achieves to decrease the applied amount of the LEDs and reduce the used amount of the diffusion plates and then, it achieves the object of reducing the production cost.

DETAILED DESCRIPTION OF THE PREFERRED EMBODIMENTS

Figure 1A:
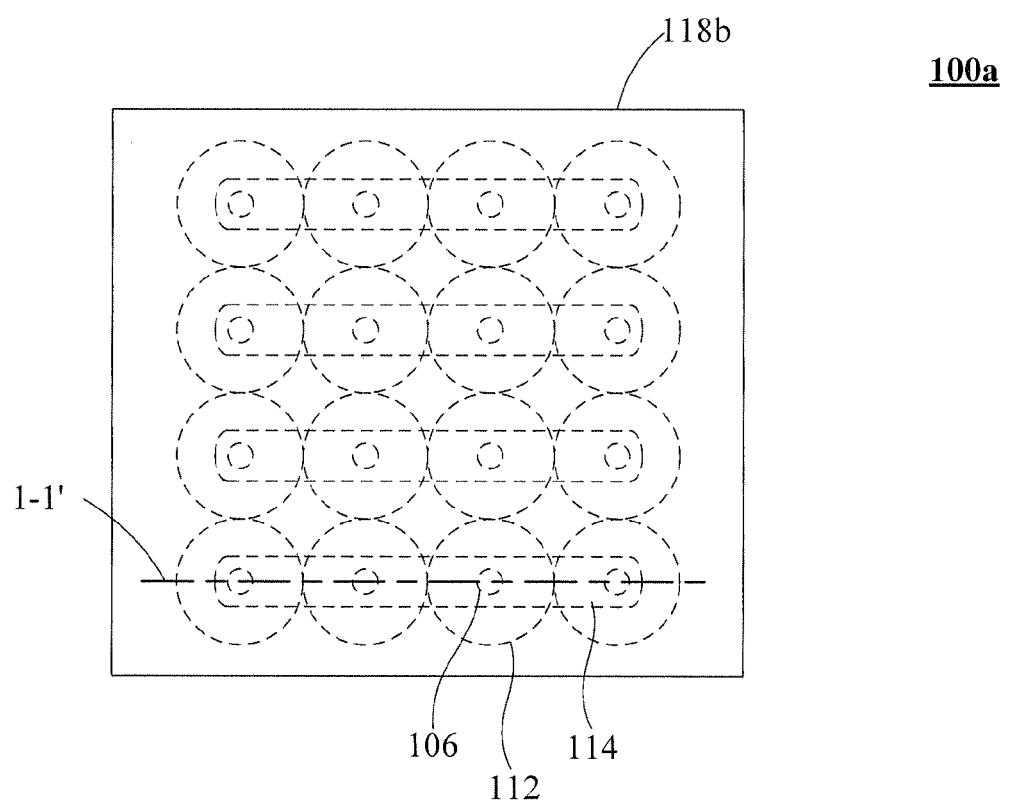
FIG. 1A is a plan view of a backlight module structure according to a first embodiment of the present invention.

The present application provides different embodiments to illustrate different technical characteristics according to various embodiments of the present invention. The configurations of the various components are described the contents according to the embodiments of the present invention disclosed, and rather than limiting of the present invention. In different drawings, the same reference numerals are provided to present the same or similar components.

Figure 1B:
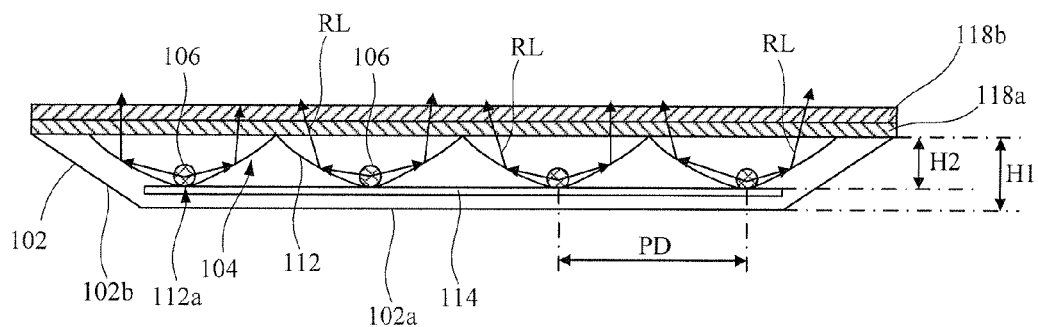
FIG. 1B is a cross-sectional view of being taken along a line 1-1' according to FIG. 1A of the present invention.

Referring to FIGS. 1A and 1B, FIG. 1A is a plan view of a backlight module structure 100a according to a first embodiment of the present invention; FIG. 1B is a cross-sectional view of being taken along a line 1-1' according to FIG. 1A of the present invention. As shown in FIGS. 1A and 1B, the direct type backlight module structure 100a comprises a light casing 102, a reflection device 104, a plurality of light sources 106, a diffusion plate 108, a diffusion film 110 and a plurality of strip plate members 114. The light casing 102 has a first height H1. In one embodiment, the light casing 102 comprises a base plate 102a and lateral wall 102b, which are connected to the peripheral edges of the base plate 102a, wherein the lateral wall 102b connects to the base plate 102b for forming the first height H1 of the light casing 102. In another embodiment, the light casing 102 comprises a base plate 102a, and the base plate 102a is bent around the peripheral edges of the light casing 102 for forming the first height H1 of the light casing 102.

The reflection device 104 is disposed on the base plate 102a, and the reflection device 104 comprises a plurality of curved structural units 112, wherein each of the curved structural units 112 is bent to form a second height H2 and an intermediate base 112a, and each of the curved structural units is configured at a predetermined spacing PD therebetween to be disposed on the base plate 102a. In one embodiment, the curved structural units 112 are arranged in an array-type on the base plate 102a of the light casing 102. As shown in FIG. 1A, such as 4 by 4 array-type arrangement, but not limited thereto. In one embodiment, the first height H1 of the light casing 102 is between 0.3 and 1 times of the predetermined spacing PD of the curved structural units 112, such as 0.5 times according to one preferred embodiment. In one embodiment, the material of the reflection device 104 comprises either polyethylene terephthalate (PET) or polycarbonate (PC). In one embodiment, the first height H1 of the light casing is either greater than or equal to the second height of each of the curved structural units.

The light sources 106 are disposed on the reflection device, and each of the light sources 104 is configured at the predetermined spacing PD therebetween, wherein the predetermined spacing PD is greater than the first height H1 of the light casing 102. In one embodiment, each of the light sources 106 is a point light source, such as a light emitted diode (LED). In which, each of the light sources 106 is disposed to the intermediate base 112a of the each curved structural unit 112 of the reflection device 104 to allow an emitted light of each of the light sources 106 to pass through a surface of each of the curved structural units 112 to form uniformly distributed reflection light RL. In other words, the reflection device 104 is composed to the curved structural units 112, and each of the curved structural units 112 is a cup-shaped structure. Afterward, the light emitted diodes (LEDs) are disposed to the intermediate base of the curved structural unit 112, so that the emitted light can uniformly emit through the reflection of the reflection device 104. Therefore, it achieves to the object of reducing the height of the light casing 102 and increasing the uniformity of the backlight module structure 100a.

The diffusion plate 118a is disposed above the reflection device 104 for receiving the reflected light RL. The diffusion film 118b is disposed on the diffusion plate 118a for receiving the scattered reflected light RL. Each of the strip plate members 114 is configured at a predetermined amount of the curved structural units 112 which are connected to the base plate 102a of the light casing. As shown, one strip plate members 114 is configured with four curved structural units 112, but not limited thereto, such as more or less than four curved structural units 112. In another embodiment, the curved structural unit 112 can independently be disposed on the base plate 102a of the light casing 102.

Figure 2A:
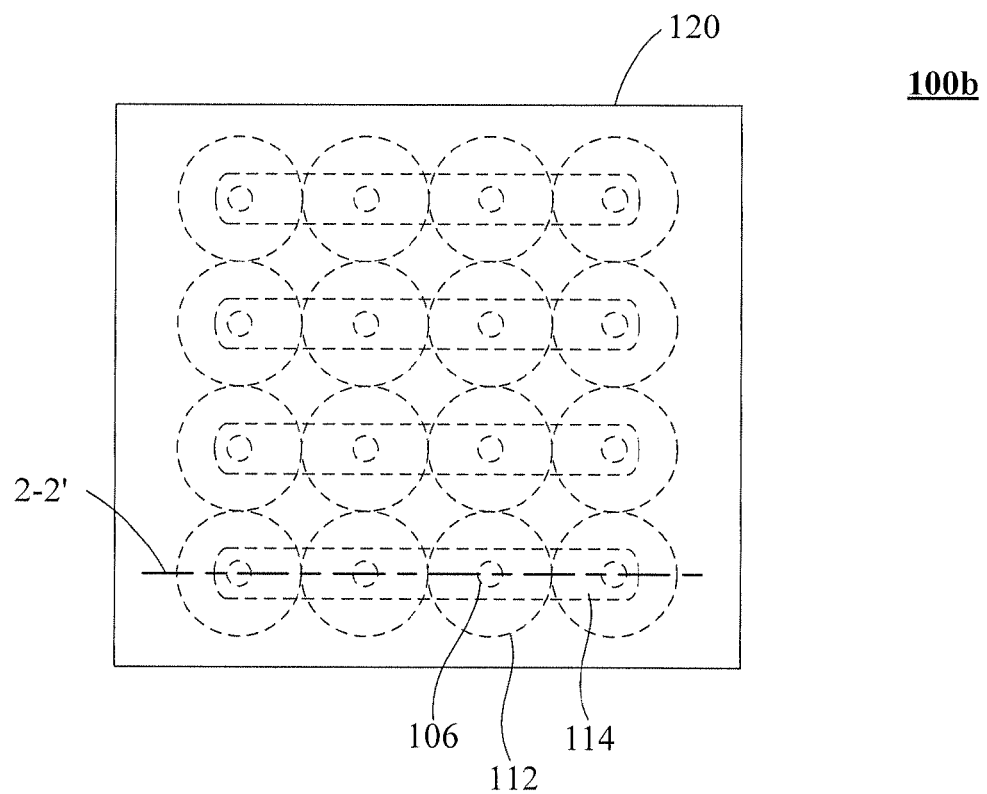
FIG. 2A is a plan view of a backlight module structure according to a second embodiment of the present invention.
Figure 2B:
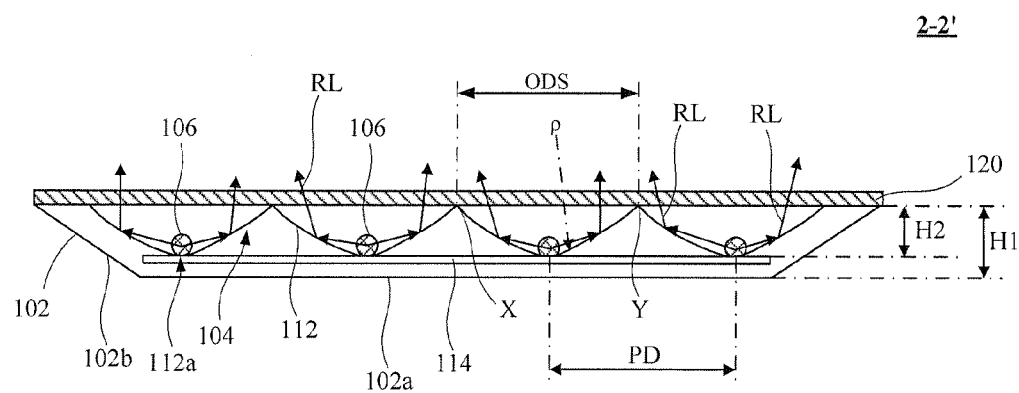
FIG. 2B is a cross-sectional view of being taken along a line 2-2' according to FIG. 2A of the present invention.

Referring to FIGS. 2A and 2B, FIG. 2A is a plan view of a backlight module structure 100b according to a second embodiment of the present invention; FIG. 2B is a cross-sectional view of being taken along a line 2-2' according to FIG. 2A of the present invention. As shown in FIGS. 2A and 2B, the direct type backlight module structure 100b comprises a light casing 102, a reflection device 104, a plurality of light sources 106, a brightness enhancement film (BEF) 120 and strip plate members 114. The light casing 102 has a first height H1. In one embodiment, the light casing 102 comprises a base plate 102a and lateral wall 102b connecting to the peripheral edges of the base plate 102a. The lateral wall 102b connecting to the base plate 102b is formed the first height H1 of the light casing 102. The reflection device 104 is disposed on the base plate 102a, and the reflection device 104 comprises a plurality of curved structural units 112, wherein each of the curved structural units 112 is bent to form a second height H2 and an intermediate base 112a. In addition, each of the curved structural units 112 is configured at a predetermined spacing PD therebetween to be disposed on the base plate 102a. In one embodiment, the curved structural units 112 are arranged in an array-type on the base plate 102a of the light casing 102, as shown in FIG. 1A, such as 4 by 4 array-type arrangement, but not limited thereto. In one embodiment, the first height H1 of the light casing 102 is between 0.3 and 1 times of the predetermined spacing PD of the curved structural units 112, such as 0.5 times according to one preferred embodiment.

The light sources 106 are disposed on the reflection device 104, and each of the light sources 106 is configured at the predetermined spacing PD, wherein the predetermined spacing PD is greater than the first height H1 of the light casing 102. In which, each of the light sources 106 is disposed on the intermediate base 112a of the each curved structural unit 112 of the reflection device 104 to allow an emitted light of the each light source 106 to pass through the surface of each of the curved structural units 112 for forming uniformly distributed reflection light RL. In other words, the reflection device 104 is composed to a plurality of curved structural units 112, and each of the curved structural units 112 is a cup-shaped structure. Afterward, the light emitted diodes (LEDs) are disposed on the intermediate base of the curved structural unit 112, so that the emitted light can uniformly emit through the reflection of the reflection device 104. Therefore, it achieves to the object of reducing the height of the light casing 102 and increasing the uniformity of the backlight module structure 100a.

The brightness enhancement film (BEF) 120 is for receiving the reflected light RL. In another embodiment, the brightness enhancement film (BEF) 120 is substituted for a dual brightness enhancement film (DBEF) 122 for receiving the reflector light RL. Each of the strip plate members 114 are configured at a predetermined amount of the curved structural units 112 and fixedly connected to the base plate 102a of the light casing 102.

Particularly, as shown in FIGS. 2A and 2B, each of the curved structural units 112, which $k=\Delta\psi/\Delta s$ of the mean curvature is defined as the average bending degree of curve XY, wherein $\Delta\psi$ presents the changed angle of tangents on the curve XY, and $\Delta s$ presents the arc length of the curve XY. $\rho=1/k$ of the radius of curvature is presented as the radius of an arbitrary point on the curve XY, wherein each of the radius of curvature corresponds to a curvature k. If the size of an opening ODS is constant, the mean curvature k is getting greater as the second height H2; if the second height H2 is constant, the mean curvature k is getting smaller while the size of the opening ODS is greater.

In other words, each of the curved structural units 112 of the reflection device 104 reflects the light for forming uniformly reflected light RL to the outer part of the backlight module structure 100*b* by penetrating the brightness enhancement film (BEF) 120. Due to adjusting the height and curvature of each of the curved structural units 112, the reflection device 104 is optimized to uniform the emitted light and increase the utilization of LED light sources. Therefore, it further achieves to decrease the applied amount of LEDs and reduce the used amount of the diffusion plates and then, it achieves the object of reducing the production cost.

In summary, the direct type backlight module structure of the present invention is provided to solve the problems that the backlight module can not be uniformly mixed light and the thickness of the light casing is too great, so as to decrease the used amount of LEDs to reduce the production cost. Moreover, based on adjusting the height and curvature of each of the curved structural units, the reflection device 104 is optimized to reduce the used amount of the diffusion plates.

As is understood by a person skilled in the art, the foregoing preferred embodiments of the present invention are illustrative rather than limiting of the present invention. The present invention has been described with a preferred embodiment thereof and it is understood that many changes and modifications to the described embodiment can be carried out without departing from the scope and the spirit of the invention that is intended to be limited only by the appended claims.

What is claimed is:

1. A direct type backlight module structure, comprising:
   a light casing having a first height, wherein the light casing comprises a base plate;
   a reflection device disposed on the base plate, wherein the reflection device comprises a plurality of curved structural units, wherein each of the curved structural units is bent to form a second height and a middle base, and each of the curved structural units is configured at a predetermined spacing therebetween to be disposed on the base plate; and
   a plurality of light sources disposed on the reflection device, wherein each of the light sources is configured at the predetermined spacing, and the predetermined spacing is larger than the first height of the light casing;
   wherein each of the light sources is disposed on the intermediate base of each of the curved structural units of the reflection device to allow an emitted light of each of the light sources to pass through a surface of each of the curved structural units to form uniformly distributed reflection light;
   wherein each of the curved structural units comprises a mean curvature, by adjusting the second height and the mean curvature of each of the curved structural units to allow the light emitted from each of the light sources to pass through the surface of each of the curved structural units for forming uniformly the distributed reflection light.

2. The direct type backlight module structure according to claim 1, wherein the curved structural units are arranged in an array type on the base plate of the light casing.

3. The direct type backlight module structure according to claim 1, wherein the first height of the light casing is between 0.3 and 1 times of the predetermined spacing of the curved structural units.

4. The direct type backlight module structure according to claim 1, further comprising: a plurality of strip plate members, wherein each of the strip members comprises a predetermined amount of cured structural units which are connected to the base plate of the light casing.

5. The direct type backlight module structure according to claim 1, wherein the first height of the light casing is either greater than or equal to the second height of each of the curved structural units.

6. The direct type backlight module structure according to claim 1, wherein the material of the reflection device comprises either polyethylene terephthalate (PET) or polycarbonate (PC).

7. The direct type backlight module structure according to claim 1, wherein the light sources comprises a plurality of light emitting diodes (LEDs).

8. The direct type backlight module structure according to claim 1, further comprising a diffusion plate disposed above the reflection device for receiving the reflected light.

9. The direct type backlight module structure according to claim 8, further comprising a diffusion film disposed on the diffusion plate for receiving the distributed reflection light.

10. The direct type backlight module structure according to claim 1, further comprising either a brightness enhancement film (BEF) or dual brightness enhancement film (DBEF) for receiving the reflected light.

* * * * *